(12) United States Patent
Bohannon et al.

(10) Patent No.: US 9,704,166 B2
(45) Date of Patent: Jul. 11, 2017

(54) METHODS AND SYSTEMS FOR PROVIDING CUSTOM ERROR PAGES FOR RETAIL APPLICATIONS

(75) Inventors: Michelle Bohannon, Roselle, IL (US); Daran Redenbaugh, Chicago, IL (US); Jim Williams, Chicago, IL (US); Bob Whiting, Chicago, IL (US); Laura Lee, Chicago, IL (US); John Burger, Chicago, IL (US); Kevin Meyer, Mount Prospect, IL (US)

(73) Assignee: SEARS BRANDS, L.L.C., Hoffman Estates, IL (US)

( * ) Notice: Subject to any disclaimer, the term of this patent is extended or adjusted under 35 U.S.C. 154(b) by 358 days.

(21) Appl. No.: 13/494,426

(22) Filed: Jun. 12, 2012

(65) Prior Publication Data
US 2013/0332272 A1    Dec. 12, 2013

(51) Int. Cl.
*G06Q 30/02* (2012.01)
(52) U.S. Cl.
CPC ......... *G06Q 30/02* (2013.01); *G06Q 30/0255* (2013.01); *G06Q 30/0266* (2013.01)
(58) Field of Classification Search
CPC ................ G06Q 30/0255; G06Q 30/0256
USPC .......................................... 705/14.53, 14.54
See application file for complete search history.

(56) References Cited

U.S. PATENT DOCUMENTS

| 8,843,536 | B1* | 9/2014 | Elbaz ............... G06F 17/30887 |
| | | | 705/26.1 |
| 2002/0103663 | A1* | 8/2002 | Bankier ................. G06Q 20/00 |
| | | | 709/224 |
| 2008/0304518 | A1* | 12/2008 | Cheng et al. ................. 370/474 |
| 2010/0106571 | A1* | 4/2010 | Catorcini et al. ............ 705/14.4 |
| 2011/0066497 | A1* | 3/2011 | Gopinath et al. .......... 705/14.53 |
| 2011/0087916 | A1* | 4/2011 | Yoo ........................ G06Q 30/02 |
| | | | 714/2 |
| 2012/0159294 | A1* | 6/2012 | Gonsalves ........ G06F 17/30873 |
| | | | 715/205 |
| 2013/0080253 | A1* | 3/2013 | Kritt .................. G06Q 30/0251 |
| | | | 705/14.57 |

OTHER PUBLICATIONS http://www.thesitewizard.com, How to Set Up a Custom 404 File Not Found Page, Heng, Christopher, Site visited Jun. 4, 2012.

* cited by examiner

*Primary Examiner* — David Stoltenberg
*Assistant Examiner* — Allan Woodworth, II
(74) *Attorney, Agent, or Firm* — McAndrews, Held & Malloy, Ltd.

(57) ABSTRACT

Example methods and systems for providing custom error pages for retail applications are disclosed. In general, the disclosed example systems provide error pages which are presented after a user attempts to access an inactive, unavailable, or nonexistent website address. In one aspect of the present disclosure, the system provides an error page which is customized, for example, based upon the website address that the user was attempting to access; based upon the user's history; based upon the system's most popular products and/or categories; and/or based upon some combination of those criteria.

23 Claims, 6 Drawing Sheets

METHODS AND SYSTEMS FOR PROVIDING CUSTOM ERROR PAGES FOR RETAIL APPLICATIONS

FIELD OF THE DISCLOSURE

The present disclosure generally relates to network error pages and more particularly to methods and systems for providing custom error pages for retail applications.

BACKGROUND

Technological advances and the proliferation of e-commerce have affected the users' retail experience. A growing number of customers are searching for, and purchasing items online. However retail websites often are contain errors causing users to be redirected to an inactive, unavailable, or nonexistent network address. For example, a retailer may provide a website address that is non-existent or inactive website address, or a link on an existing website may redirect users to an inactive, unavailable, or nonexistent website address. Currently, when this occurs, users are redirected to a generic error page which merely informs the user that an error as occurred.

Creating customized web pages corresponding to the "404 File Not Found" error code is known in the art. In particular many Apache web servers allow users to create an .htaccess file which allows users to specify a webpage to display when the web server encounters a "404 File Not Found" error. For example existing customized error pages may contain text explaining that the page cannot be found, a link back to the main website, instructions to return to the previous location, and/or a search box which allows the user to search the retail site.

However, these generic error pages interrupts the flow of the user's retail experience, and the generic error pages do not relate to the website that the user was attempting to reach. It is preferable to provide an error page which allows users to continue their retail experience, and which is customized and/or targeted to the user.

DETAILED DESCRIPTION

The following description of example methods and apparatus is not intended to limit the scope of the description to the precise form or forms detailed herein. Instead, the following description is intended to be illustrative so that others may follow its teachings.

Example methods and systems for providing custom error pages for retail applications. In general, the disclosed example systems provide error pages which are presented after a user attempts to access an inactive, unavailable, or nonexistent website address. In one aspect of the present disclosure, the system provides an error page having customized shoppable objects based upon the website address that the user was attempting to access; based upon the user's history; based upon the system's most popular products and/or categories; and/or based upon some combination of those criteria.

Figure 1:
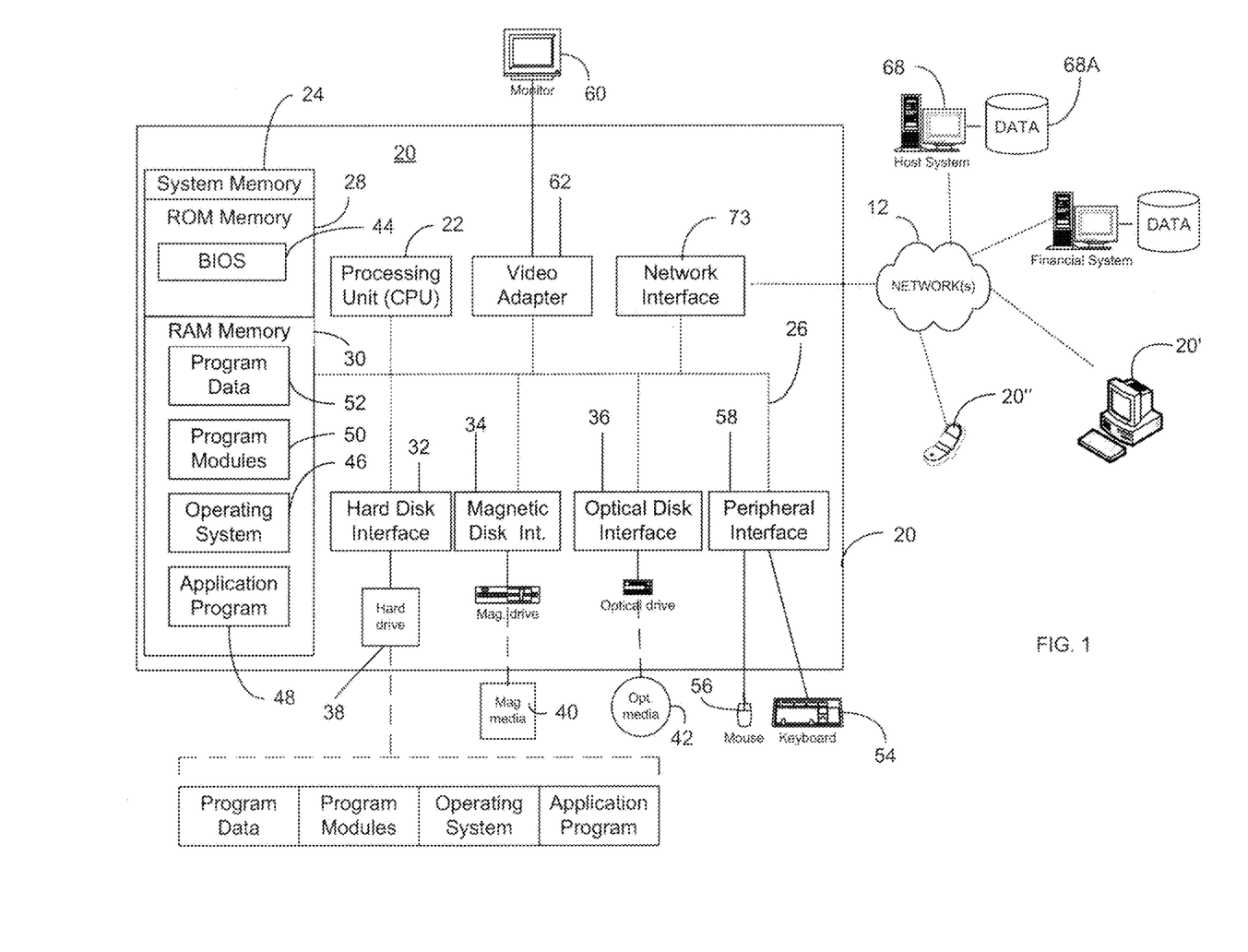
FIG. 1 illustrates, in block diagram form, components of an example computer network environment suitable for implementing the example household device management system.

With reference to the figures, the following disclose various example systems and methods for providing customized error pages for retail applications. To this end, FIG. 1 illustrates a processing device 20, illustrated in the exemplary form of a mobile communication device, a processing device 20', illustrated in the exemplary form of a computer system, and a processing device 20" illustrated in schematic form, such as, for example, an appliance is provided with executable instructions to provide a means for a customer, e.g., a user, consumer, etc., to interact with the device 20 and/or to access a host system server 68. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, 20', 20" illustrated in FIG. 1 may be embodied in any device having the ability to execute instructions such as, by way of example, an appliance, a personal computer, mainframe computer, personal-digital assistant ("PDA"), cellular telephone, tablet, e-reader, or the like. Furthermore, while described and illustrated in the context of a single processing device 20, 20', 20" those of ordinary skill in the art will also appreciate that the various tasks described hereinafter may be practiced in a distributed environment having multiple processing devices linked via a local and/or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read-only memory (ROM) 28 and/or random-access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules and other data for the processing device 20. Those of ordinary skill in the art will further appreciate that other types of non-transitory computer-readable media that can store data and/or instructions may be used for this same purpose. Examples of such media devices include, but are not limited to, magnetic cassettes, flash memory cards, digital videodisks, Bernoulli cartridges, random-access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer-executable instructions comprising an operating system 46, one or more applications programs 48 (such as a Web browser), other program modules 50, and/or program data 52. Still further, computer-executable instructions may be downloaded to one or more of the computing devices as needed via a network connection, for example.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, motion sensor, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices not shown, such as, for example, speakers, cameras, printers, or another suitable device.

As noted, the processing device 20 may also utilize logical connections to one or more remote processing devices, such as the host system server 68 having associated data repository 68A. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, etc.

For performing tasks as needed, the host system server 68 may include many or all of the elements described above relative to the processing device 20. In addition, the host system server 68 would generally include executable instructions for, among other things, receiving information regarding server requests from a user, receiving information regarding a system's available retail offers, and a system's retail products.

Communications between the processing device 20 and the host system server 68 may be exchanged via a further processing device, such as a network router (not shown) that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

Figure 2:
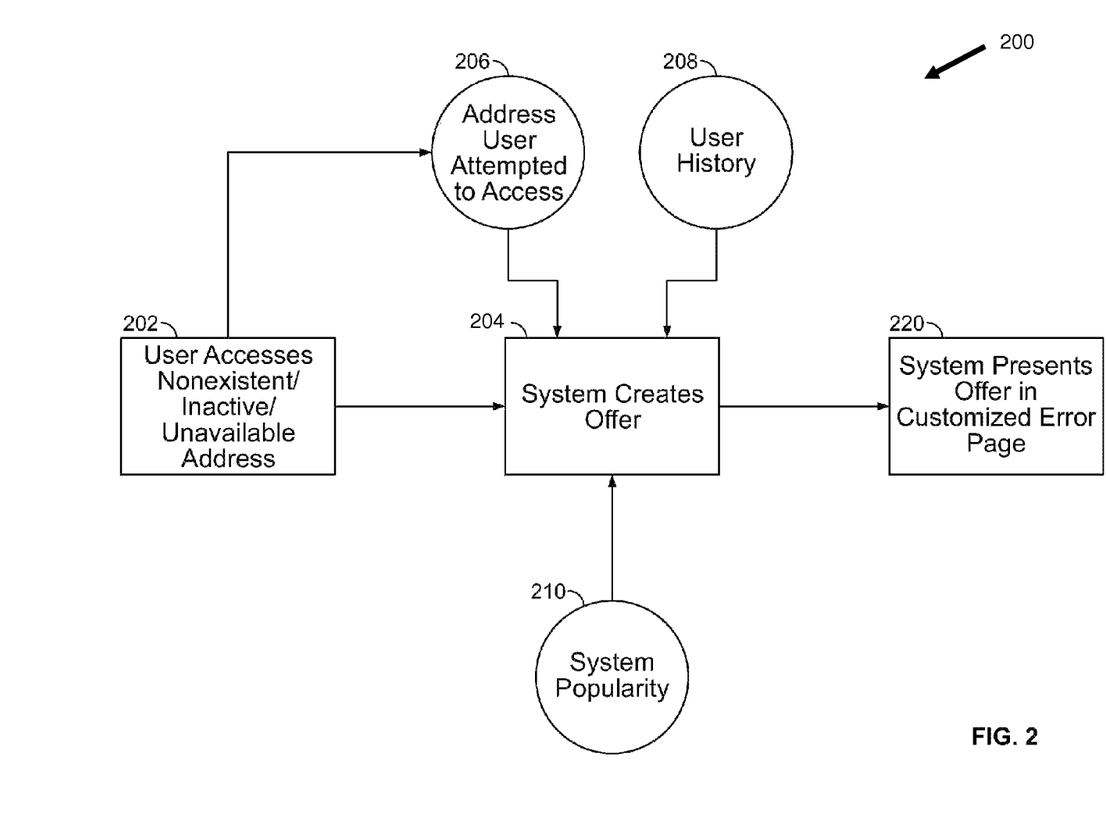
FIG. 2 is a flowchart diagram depicting a process of providing customized error pages for retail applications of the present disclosure.

FIG. 2 illustrates an example flow diagram of the process 200 for providing custom error pages for retail applications. As shown in FIG. 2, the example process 200 operates when a user attempts to access a website address that is inactive, nonexistent, and/or unavailable in block 202. For instance, the website address may be inactive, nonexistent and/or unavailable because the website address has changed and the system server has not been updated to reflect the changes, because the system is experiencing high traffic, because of a network error, because of typographical error and/or any other type of system error.

Next, as shown in block 204, the process 200 creates a customized error page. In the illustrated example, the customized error page comprises one or more retail offers (e.g. the error page is "shoppable"). The offer may be in the form of a discount on the sales price of products or services, an offer for free shipping on the delivery of products, an offer to purchase products that are not available to the public, an offer for reward points in retail reward system, and/or any other type of offer that relates to the retail context. The offers may be offers that are currently available to all users, or may be specially created for the user, or specially created to be shown on customized error pages. Additionally, the process 200 may supply offers that relate and/or refer to the "404" error message, for example, the process 200 may offer a product or for $4.04, or $40.40, or $404.00; and/or the process 200 may offer a 4.04% or 40.4% discount on certain items.

As shown in block 206, the example process 200 provides a retail offer related to the website address that the user was attempting to access in block 202. For instance, if the user was attempting to reach a product page, the example process 200 provides an offer in the same sales department as the product that the user originally tried to access, an offer for a product that performs the same function as the product that the user originally tried to access, and/or an offer for a product related to the product that the user originally tried to access in any other way. In addition, if the process 200 detects that the user is attempting to access a retail website page related to a certain product or category of products, and the process 200 provides a retail offer related to that the product or category of products.

As shown in block 208, the example process 200 provides a retail offer related to the user's history. For example, the retail offer may be related to the user's purchase history, the user's navigation history on the retail website, a user's browsing history on the retail website, any biographic data that the system may have about the user, any geographic data that the system my have about the user, and/or any other criteria related to the user's history.

As shown in block 210, process 200 may provide a retail offer related to a popular retail item. For example, the process 200 may provide the user with the best-selling, or most popular item for the retail system, the best-selling or most popular retail item related to the product that the user originally attempted to access, the best-selling or most popular retail item in a certain product category, and/or the best selling or most popular retail item related to the user history.

As shown in block 220, the process 200, provides the user with an error page, which comprises one or more offers as created in blocks 206, 208, and/or 210. The error page may also contain other features such as a search bar, a redirection page, informational text, apologies from the retailer, any combination of those features, and/or any other appropriate feature.

In this example, the retail system tracks and stores information about a user's session on the retail site in cached memory (eg. as a cookie, in coded memory, etc. Thus the retail system will be able to identify which web address the user was trying to reach. Using this information, the process 200 creates an offer related to the product and/or product category that the user originally attempted to access. For instance, if the user attempted to access the product page for a certain toaster, the process 200 may display an offer for another, discounted toaster. If the user attempted to access a webpage related to gardening and lawn supplies, the process 200 may display an offer for a discounted hose nozzle. If the user attempted to access a webpage in the retailer's electronics department, the process 200 may display an offer for a discounted television set. If the user attempted to access a webpage in the retailer's apparel department, the process 200 may display an offer for a discount on the user's next clothing purchase. It will be understood by one of ordinary skill in the art that once the intended destination address is known, the redirected product and/or offer displayed may be determined through any suitable marketing and/or logic means.

In addition to or as an alternate to storing information about a user's session in cached memory the process 200 may use the web address of the inaccessible website to determine the user's intended destination. For instance, in one example the process 200 uses this information to create an offer to display on the customized webpage. Specifically, in some networks, the web address of a product page on the retail website typically contains the department and/or category associated with that product. For instance, the web address of a product page for a refrigerator contains the word "Appliances" to indicate that the refrigerator is in the Appliances department. The web address of a product page for a refrigerator also contains the word "Refrigerators" to indicate that the product is in the Refrigerator subcategory. The process 200 uses this information to display a customized offer related to the product page that the user attempted to access. In this example, where the user attempted to access a product page for a refrigerator product, the process 200 may display an offer for a refrigerator product, a product in the Appliance department, or a discount on a future purchase of a refrigerator or Appliance product.

Still further, in yet another example, the offer chosen in block 206 of the process 200 may be targeted toward the user based on the user's previous actions on the retail site. More particularly, to develop the offer to the consumer, the retailer analyzes the user's previous actions on the retail site and associates the user with a proxied user to predict the user's interests and desires. Using the profile of the proxied user, the retailer can create offers in block 206 according to the offers that the proxied user would be interested in. Moreover, if the user is logged into the retail website, the example retailer uses information from the user's profile (e.g., geographic information, purchasing history, wish list, biographic information, etc.) to create a targeted offer at block 206.

In yet another example, if the user mistypes a web address associated with a retailer, the example system 200 displays an error page without a retail offer. In this case, because of the manner in which the event occurs, the retailer typically does not have any information about the user's previous actions on the retailer's website. Moreover, the web address entered by the user is incorrect, and thus the error page displayed is due to user error, and not due to any error in the retailer's system so there is no reason to present the user with a discount offer.

In this example, when the process 200 creates an offer at block 206 the offer may be an offer that is available elsewhere to all customers of the retailer, or the offer may only be available to users through the customized error page.

Figure 3:
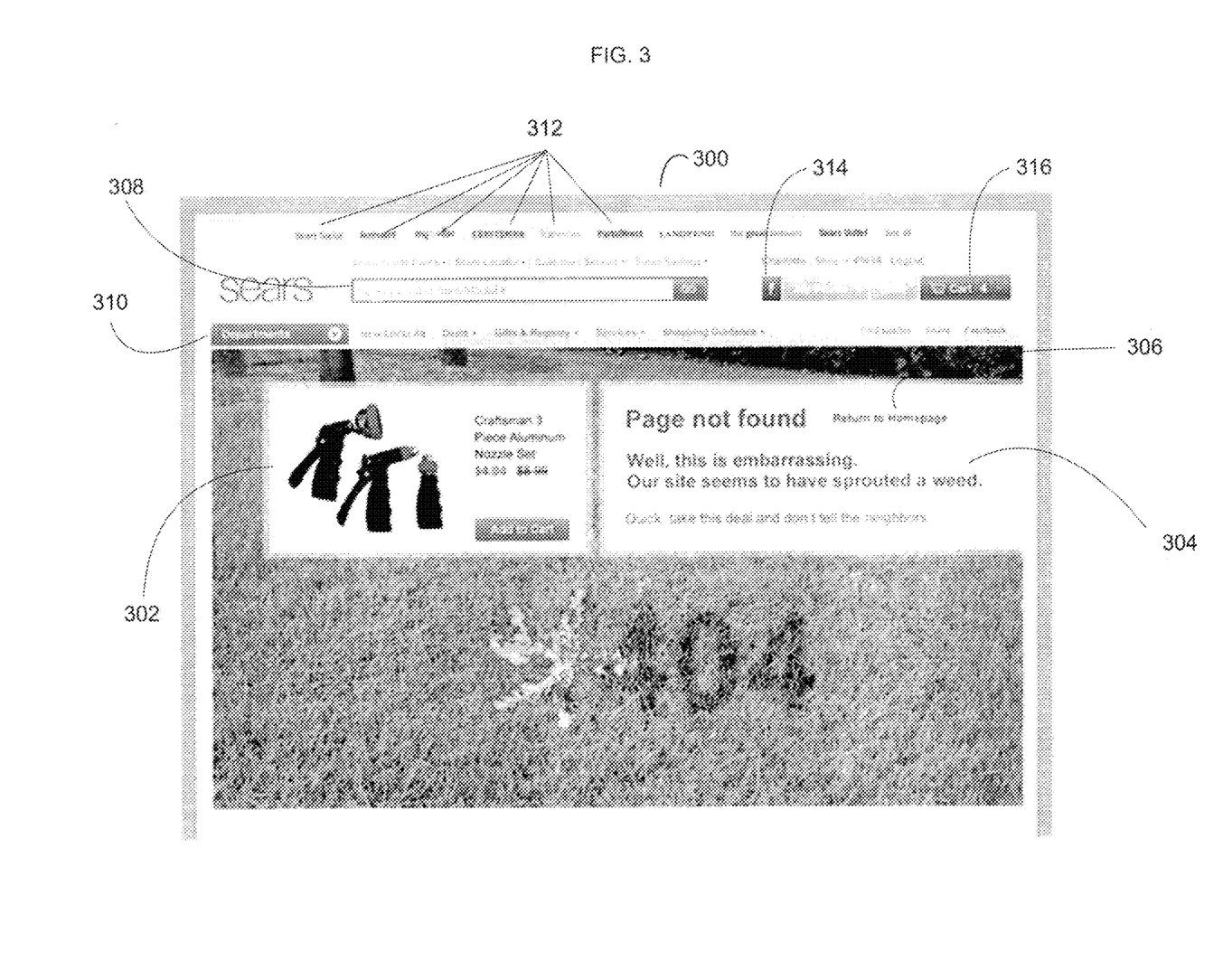
FIGS. 3-6 illustrate example user interfaces depicting customized error pages of the present disclosure

Referring to FIG. 3, an example user interface 300 of a customized error page displayed in accordance with the present disclosure is shown. In this example, the user interface 300 comprises an offer related to a nozzle set 302, which is discounted to the price of $4.04, informational text explaining the error 304, a link to the retail homepage 306, a search bar 308, links to various retail departments 310, links to various features of the retail website 312, links to social media (such as Facebook) 314, and a link to the user's shopping cart 316.

Figure 4:
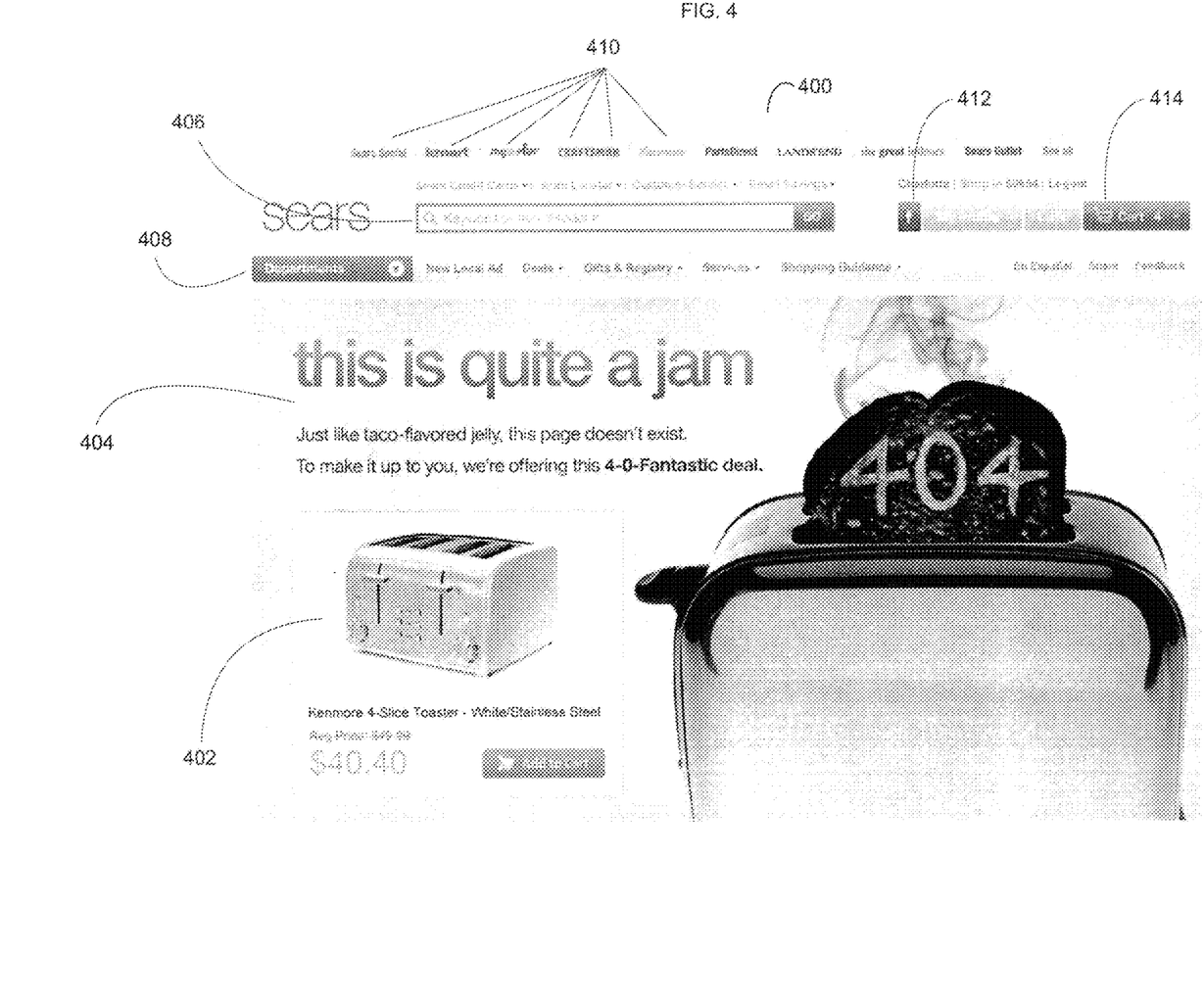

Referring to FIG. 4, there is illustrated an example user interface 400 of a customized error page provided in accordance with the present disclosure. In this example, the user interface 400 comprises an offer related to a toaster 402, which is discounted to the price of $40.40. The interface 400 also includes informational text explaining the error 404, a search bar 406, links to various retail departments 408, links to various features of the retail website 410, links to social media (such as Facebook) 412, an a link to the user's shopping cart 414.

Figure 5:
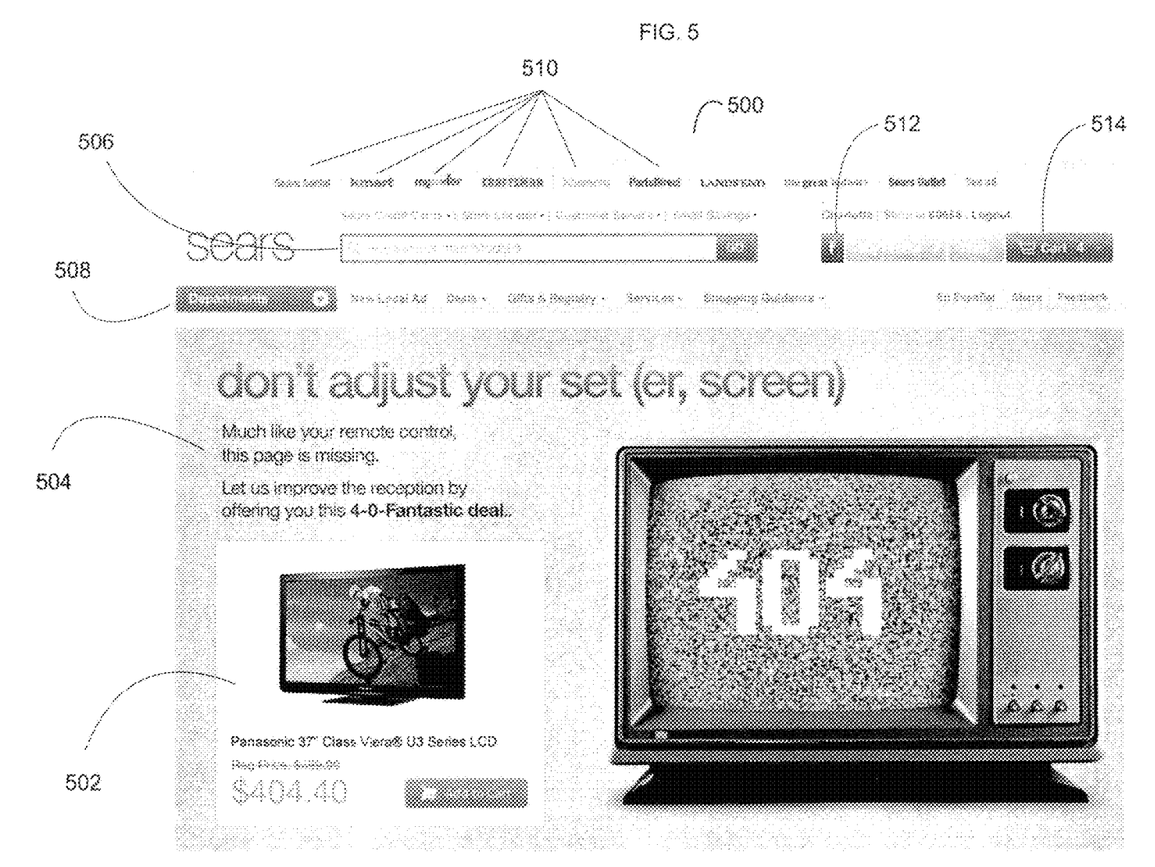

Referring to FIG. 5, user interface 500 is an example user interface of a customized error page provided in accordance with the present disclosure. In this example, the user interface 500 comprises an offer related to a television set 502, which is discounted to the price of $404.40, informational text explaining the error 504, a search bar 506, links to various retail departments 508, links to various features of the retail website 510, links to social media (such as Facebook) 512, an a link to the user's shopping cart 514.

Figure 6:
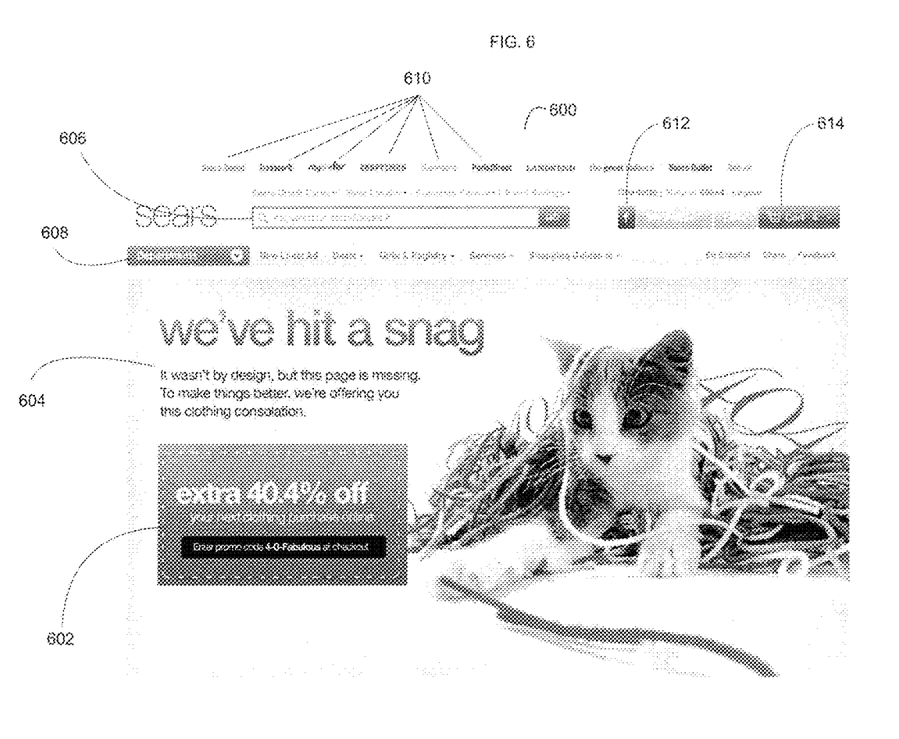

Referring to FIG. 6, user interface 600 is an example user interface of a customized error page provided in accordance with the present disclosure. In this example, the user interface 600 comprises an offer 602 for 40.4% off the user's next online clothing purchase, informational text explaining the error 604, a search bar 606, links to various retail departments 608, links to various features of the retail website 610, links to social media (such as Facebook) 612, an a link to the user's shopping cart 614.

While various concepts have been described in detail, it will be appreciated by those skilled in the art that various modifications and alternatives to those concepts could be developed in light of the overall teachings of the disclosure. For example, while various aspects of the invention have been described in the context of functional modules, it is to be understood that, unless otherwise stated to the contrary, one or more of the described functions and/or features may be integrated in a single physical device and/or a software module, or one or more functions and/or features may be implemented in separate physical devices or software modules. Further, while various aspects of the invention have been described in the context of a particular type of application (e.g., tablet, mobile, etc.), it is to be understood that, unless otherwise stated to the contrary, one or more of the described application functions, features, and/or aspects may be integrated into other application types. It will also be appreciated that a detailed discussion of the actual implementation of the modules used to perform the various described functions is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person knowledgeable in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

We claim:

1. A method of displaying a custom error message on a networked user interface, comprising:
receiving, via a network, a request to a system server, wherein the request includes a web address;
attempting to process the request to the system server;
being unable to process the request to the system server;
using one or more words in the web address to determine a department or a category that includes a retail product or service that was unsuccessfully requested;
displaying a customized web page with a customized error message on the networked user interface, wherein the customized error message comprises at least one shoppable offer for a discount on another retail product or service in the determined department or category based on the one or more words in the web address, and wherein the discount can vary and includes numbers identifying a web page error message generated as a result of the system server being unable to process the request; and
providing online shopping from the customized web page with the customized error message that includes the at least one shoppable offer.

2. The method of claim 1, wherein the discount or a price of the shoppable offer is based on the numbers that form a three digit number that identifies the web page error message.

3. The method of claim 1, wherein the at least one shoppable offer for the discount on retail products or services is based on the user's history which is based on one or more of the following: user's purchase history, user's navigation history, and user's biographical information.

4. The method of claim 1, wherein the user's request to the system is based on the website that the user was attempting to access.

5. The method of claim 1, wherein the at least one shoppable offer for the discount on retail products or services is based on the preferences of the system which are based on one or more of the following: existing offers available through the system, the system's best-selling retail products and services, and the system's most popular retail products and services.

6. The method of claim 1, further comprising displaying, on the customized web page, hyperlinks to a plurality of retail web sites and an online cart.

7. The method of claim 3, wherein the at least one shoppable offer comprises an offer that is not available to other users.

8. The method of claim 1, further comprising displaying the custom error message in a pop-up window.

9. A non-transitory computer-readable media having stored thereon computer executable instructions, wherein the instructions perform steps for displaying a custom error message comprising:
receiving, via a network, a request to a system server, wherein the request includes a web address;
attempting to process the request at the system server;
being unable to process the request to the system server;
using one or more words in the web address to determine a department or a category that includes a retail product or service that was unsuccessfully requested;
displaying a customized web page with a customized error message, and wherein the customized error message comprises at least one shoppable offer for a discount on another retail product or service in the determined department or category based on the one or more words in the web address, and wherein the discount can vary and includes numbers identifying a web page error message generated as a result of the system server being unable to process the request; and
providing online shopping from the customized web page with the customized error message that includes the at least one shoppable offer.

10. The non-transitory computer-readable media of claim 9, wherein the discount or a price of the shoppable offer is based on the numbers that form a three digit number that identifies the web page error message.

11. The non-transitory computer-readable media of claim 9, wherein the customized error message comprises an offer of free shipping or rewards points.

12. The non-transitory computer-readable media of claim 9, wherein the at least one shoppable offer for the discount on retail products or services is based on the user's history which is based on one or more of the following: user's purchase history, user's navigation history, and user's biographical information.

13. The non-transitory computer-readable media of claim 9, wherein the user's request to the system is based on the website that the user was attempting to access.

14. The non-transitory computer-readable of claim 9, wherein the at least one shoppable offer for the discount on retail products or services is based on the preferences of the system which are based on one or more of the following: existing offers available through the system, the system's best-selling retail products and services, and the system's most popular retail products and services.

15. The non-transitory computer-readable media of claim 9, further comprising displaying, on the customized web page, hyperlinks to a plurality of retail web sites, and an online cart in addition to the customized error message.

16. The non-transitory computer-readable media of claim 13, wherein the at least one shoppable offer comprises an offer that is not available to other users.

17. The non-transitory computer-readable media of claim 9, further comprising displaying the custom error message in a pop-up window.

18. The method of claim 1, wherein a percentage of the discount of the shoppable offer is formed from a three digit number that identifies the web page error message.

19. The non-transitory computer-readable media of claim 9, wherein a price of the shoppable offer is formed from a three digit number that identifies the web page error message.

20. The method of claim 1, wherein a percentage of the discount of the shoppable offer is formed from numbers of a code that identifies the web page error message.

21. The method of claim 1, wherein the web page error message includes a 404 error message, and wherein the at least one shoppable offer includes one of the following: a product offer price of $4.04, $40.40, or $404.00, and the discount of 4.04% or $40.4%.

22. The method of claim 1, wherein the web page error message includes a 404 error message, and wherein the at least one shoppable offer uses one or more 4s and a zero since the web page error message includes a 404 error message.

23. The method of claim 1, wherein the request is unable to be processed because a web page is not available on a retail website, and wherein the online shopping from the customized web page with the customized error message that includes the at least one shoppable offer continues on the retail website.

* * * * *